(12) United States Patent
Manders et al.

(10) Patent No.: US 7,744,012 B2
(45) Date of Patent: Jun. 29, 2010

(54) LIQUID MANURE SPREADING APPARATUS

(76) Inventors: Walter J. A. Manders, 10995 Hull Rd., Weston, OH (US) 43569; Hein J. T. M. Manders, 11190 Range Line Rd., Weston, OH (US) 43569

( * ) Notice: Subject to any disclaimer, the term of this patent is extended or adjusted under 35 U.S.C. 154(b) by 100 days.

(21) Appl. No.: 12/070,997

(22) Filed: Feb. 22, 2008

(65) Prior Publication Data

US 2009/0211504 A1 Aug. 27, 2009

(51) Int. Cl.
*A01G 25/09* (2006.01)
*A01G 1/20* (2006.01)
*B05B 17/00* (2006.01)
*E01C 19/16* (2006.01)
*E01H 3/02* (2006.01)

(52) U.S. Cl. .............................. 239/1; 239/159; 239/172

(58) Field of Classification Search .................... 239/1, 239/159–168, 172, 727; 111/118, 200, 900
See application file for complete search history.

(56) References Cited

U.S. PATENT DOCUMENTS

| | | | |
|---|---|---|---|
| 3,395,612 A * | 8/1968 | Serratoni et al. ............. | 356/256 |
| 3,770,060 A * | 11/1973 | Forsyth et al. ................ | 169/24 |
| 3,913,837 A * | 10/1975 | Grant ......................... | 239/198 |
| 3,997,118 A | 12/1976 | Bedwell et al. | |
| 4,014,271 A | 3/1977 | Rohlf et al. | |
| 4,056,226 A | 11/1977 | Hodgson | |
| 4,079,892 A | 3/1978 | Hodgson | |
| 4,082,227 A | 4/1978 | McGrane et al. | |
| 4,168,801 A | 9/1979 | Kuck et al. | |
| 4,232,616 A | 11/1980 | van der Lely | |
| 4,240,584 A * | 12/1980 | Courtright ................... | 239/745 |
| 4,345,654 A * | 8/1982 | Carr ............................ | 169/24 |
| 4,346,843 A * | 8/1982 | Long et al. .................. | 239/745 |
| 4,354,624 A | 10/1982 | Chowdhury et al. | |
| 4,475,692 A | 10/1984 | Walley | |
| 4,592,294 A | 6/1986 | Dietrich, Sr. et al. | |
| 4,593,855 A * | 6/1986 | Forsyth ....................... | 239/74 |
| 4,669,145 A * | 6/1987 | Kehr ........................... | 15/302 |
| 4,770,348 A | 9/1988 | Rieke | |
| 4,819,880 A | 4/1989 | Linde et al. | |
| 4,830,283 A * | 5/1989 | Johnson ...................... | 239/197 |
| 4,832,267 A | 5/1989 | Meek | |

(Continued)

FOREIGN PATENT DOCUMENTS

EP 1 044 592 A1 10/2000

OTHER PUBLICATIONS

Veenhuis Machines Raalte—Press Release "Veenhuis Slurry Reel System", Jul. 4, 2006.

*Primary Examiner*—Christopher J. Novosad
(74) *Attorney, Agent, or Firm*—Fraser Clemens Martin & Miller LLC; J. Douglas Miller

(57) ABSTRACT

This invention is directed to a device for applying slurry manure beneath the soil or on top of the soil with reduced crop displacement by a trailing feeder hose. More specifically, the invention is directed to an improvement of the prior art slurry reel system. The slurry reel system of the present invention places the axis of the reel spool parallel with the direction of travel instead of the conventional perpendicular orientation. This invention also utilizes a unique hose placement and retrieval apparatus or boom.

7 Claims, 3 Drawing Sheets

U.S. PATENT DOCUMENTS

| | | | |
|---|---|---|---|
| 4,896,686 A * | 1/1990 | Schmidt et al. | 134/167 C |
| 4,928,889 A * | 5/1990 | Lucas | 239/751 |
| 4,967,960 A * | 11/1990 | Futrell | 239/148 |
| 5,271,567 A | 12/1993 | Bauer | |
| 5,489,066 A * | 2/1996 | Oldham | 239/745 |
| 5,649,573 A | 7/1997 | Crum et al. | |
| 5,671,891 A | 9/1997 | Keenan et al. | |
| 5,711,490 A * | 1/1998 | Hansinger | 239/745 |
| 5,741,090 A * | 4/1998 | Dunning et al. | 405/263 |
| 5,755,058 A | 5/1998 | Guyot et al. | |
| 5,813,613 A | 9/1998 | Keenan et al. | |
| 5,865,131 A | 2/1999 | Dietrich, Sr. et al. | |
| 5,907,925 A * | 6/1999 | Guyot | 47/58.1 R |
| 5,941,464 A | 8/1999 | Seymour | |
| 6,047,908 A | 4/2000 | Seymour et al. | |
| 6,092,745 A | 7/2000 | Seymour et al. | |
| 6,123,036 A | 9/2000 | Decker | |
| 6,164,560 A * | 12/2000 | Lehrke et al. | 239/172 |
| 6,206,306 B1 | 3/2001 | McFarlane | |
| 6,234,409 B1 * | 5/2001 | Aslakson | 239/172 |
| 6,701,856 B1 | 3/2004 | Zoske et al. | |
| 6,708,926 B2 * | 3/2004 | Bonisch | 244/137.1 |
| 6,973,884 B2 | 12/2005 | Dietrich, Sr. | |
| 6,973,975 B1 * | 12/2005 | Adamson et al. | 169/24 |
| 7,121,483 B2 | 10/2006 | Courtemanche | |
| 7,159,889 B2 | 1/2007 | Nuhn et al. | |
| 2004/0089734 A1 * | 5/2004 | Martin | 239/146 |

* cited by examiner

LIQUID MANURE SPREADING APPARATUS

TECHNICAL FIELD

This application relates to a device for applying slurry fertilizer beneath the soil or on top of the soil with reduced crop displacement by a trailing feeder hose. More specifically, the present invention is directed to an improvement of the prior art slurry reel system. The slurry reel system of the present invention places the axis of the reel spool parallel with the direction of travel instead of the conventional perpendicular orientation. This invention also utilizes a unique hose placement and retrieval apparatus.

BACKGROUND OF THE INVENTION

The present invention relates to agricultural fertilizer applicators. Particularly, it relates to an apparatus for application of livestock waste in the form of slurry (that is, a freely flowing mixture of liquids and solids). Historically, livestock waste, particularly in solid form, has been spread on the surface of the soil by a manure spreader using a flail to fling the material to the rear. A more modern side-discharge spreader also deposits the material on the surface of the soil.

The advent of confinement systems for animals which include pits below the confinement area produces a large amount of animal waste in a slurry form. This slurry must be handled and disposed of in an environmentally acceptable manner.

Typically, the slurry is pumped into a large tank carried by a wagon or mounted on a truck. In the past the slurry was then spread or sprayed on the surface of the soil. This procedure has, as a principle objection, a strong odor which remains after the waste is spread. Moreover, surface spreading of animal waste is not desirable with the potential runoff of nitrates and phosphorus into rivers and streams. This is objectionable because livestock waste is high in nitrogen, and swine waste is also high in phosphorus. With increasing concern with the quality of the environment, this prior art procedure is becoming less and less acceptable.

Various methods have been proposed for depositing the slurry underground. One method uses a fertilizer knife, such as shown in U.S. Pat. No. 4,592,294. The slurry is delivered behind the knife. This leaves a very narrow band of fertilizer having a high concentration of nitrogen and other nutrients.

Another method of subsoil delivery of animal waste employs a standard chisel plow shank with an attached wide cultivator sweep, in an attempt to distribute the slurry further laterally and to avoid the concentration which occurs in the prior art methods and devices.

This method, however, does not fully overcome the concentration problem, and it presents still another problem—namely, the trailing slurry hose can damage crops such as corn and soybeans. The damage caused by the trailing hose, dispensed from the reel carrier, especially when a turn is made in the field can damage row crops such corn and soy beans.

A company by the name of Veenhuis B. V. of Raalte, The Netherlands makes and distributes a full line of slurry dispensing systems. Veenhuis also has a slurry reel system. It utilizes a trailing hose slurry injector. An advantage to a trailing hose injector is its ability to smoothly apply slurry in or onto the soil. It also provides for less damage to the soil. The slurry is supplied through the hose, rather than dragged along with a tank across the land.

This new method of slurry delivery has many advantages. One important advantage is that it has less impact on the sward. The sward is a portion of the ground covered with grass or other vegetation. A slurry reel system has other advantages including use of the maximum load of the carrier truck (maximum capacity) and minimum pulling power. This is because the hose is not pulled across the land, but alternatively reeled and unreeled. As such, this method requires less pulling power and the large capacity of the reel system allows for working lengths of 700 meters or more, preferably 1000 meters or more. The Veenhuis slurry reel system does not suggest nor disclose how to improve on the reel system by moving the axis of the reel to parallel with the direction of travel and a hose handler that reduces forces on the hose and lessens damage to row crops that are in the field.

U.S. Pat. No. 5,907,925 to Guyot discloses a method for treatment of waste material which comprises supplying waste material in slurry form to a dispensing machine. The disclosed dispensing machine includes a frame with ground wheels for moving across the field. The frame carries a reel on which is wound a pipe or hose for transporting the waste material from the supply tank. This reference does not suggest nor disclose that the axis of the reel is parallel with the direction of travel of the frame, nor does the reference disclose or suggest the presence of a hose dispensing/retrieval boom that is attached to the frame and is perpendicular to the axis of the hose reel.

SUMMARY OF THE INVENTION

It is one aspect of the present invention that the reel handler is finely suited to deal with row crops through the use of a hose laid out from the hose boom. The hose is connected to the supply tank and as such the massive weight of the tank is not placed upon the field. The present invention comprises a reel with the hose being wrapped thereon. The reel is rotatable to reel in and pay out the hose. Another aspect deals with the inventive hose handler to lessen stress on the hose during a turn. Typical hose diameters range from about 2 to 8 inches. Due to the unique design of the present invention slurry can be applied to larger tracts of land, with less damage to the crop and soil. The inventive hose distributor also allows the dressing of row crops with minimum damage to the crop.

The invention comprises a vehicle frame mounted on wheels for movement across the ground. The reel vehicle is relatively large having a width on the order of 10 feet or greater (excluding the boom element) and a length on the order of 25 feet. The hose is typically guided by a pulley system to facilitate winding and unwinding of the hose. The solids content of the slurry should be between 5 and 15% by weight. Preferably the solids content of the slurry should be less that 8% by weight.

The inventive machine comprises a boom for discharging and retrieval of the hose. The boom is generally in the shape of a "Y" and is attached to the frame of the vehicle in a manner that provides for raising and lowering the boom to accommodate crops of various heights. A great advantage of the trailing hose slurry system is its ability to smoothly apply slurry to the soil without unnecessary compaction of the soil. This is because the slurry is supplied through the hose, rather than dragged along in a tank across the soil.

A further aspect of the invention is the hose distribution boom which allows distribution of the slurry into row crops. The present inventive machine for spreading waste material from hog, cattle barns and the like onto or into the ground includes a frame with ground wheels for moving across the ground, the frame carrying a reel on which is wound a pipe or hose for transporting the waste material from a supply. The axis of the reel is parallel to the direction of travel. From the reel the waste material is communicated to a spray gun or spreader which discharges the material across the ground or into the ground. The other end of the hose is connected to a tank which may be mounted on a trailer or a truck. The tank transports the slurry material to the required location for distribution. The waste material is thus collected from a lagoon or storage container and is simply pumped through the hose mounted on the reel and then pumped to the distributor. The use of a tank to distribute the slurry waste is basically unacceptable for larger quantities of the material in view of the very heavy weights of such a large tank which causes compaction of the ground over which the transport vehicle travels and the repeated trips which are necessary to dispose of all of the material.

Typically the present invention is directed to a reel cart. The reel cart is typically separate from the boom or distribution. It is therefore an object of the present invention to provide a method of applying waste material to a field. The method of applying waste material to a field comprising: collecting waste material containing organic matter, the material having a chemical composition and sufficient liquid content to allow pumping of the material through a pipe or hose; providing a field arranged for planting and cultivating on the field of a crop to be harvested; transporting the waste material to the field; providing a reel cart wherein the axis of the reel is parallel to the direction of travel and wherein said reel cart comprises a hose handler; said handler comprises pick-up and discharge portions; said handler further comprises rollers on the handler.

According to a second aspect of the invention there is provided a method of applying waste material to a field comprising: (a) collecting waste material containing organic matter, the material having a chemical composition and sufficient liquid content to allow pumping of the material through a hose; (b) providing a field arranged with rows of crops; (c) transporting the waste material to the field; (d) spreading the waste material in the ground so as to provide water and nutrients for promoting growth of the crop; (e) providing a hose dispensing system wherein the axis of the reel for the hose is parallel with the direction of travel and a hose system for dispensing and retrieving said hose, said hose system comprising a dispensing arm that is generally perpendicular to the axis of the reel.

According to a third aspect of the invention there is provided a method of applying waste material to a field comprising: (a) collecting waste material containing organic matter, the material having a chemical composition and sufficient liquid content to allow pumping of the material through a hose; (b) providing a field; (c) transporting the waste material to the field; (d) dispensing the waste material wherein the waste material is spread by a machine having a central vehicle portion and a boom element extending out to a respective side of the vehicle portion with a hose discharge system diverging from the from the frame and comprising rolling guides at spaced positions along the length of boom element; (e) providing valves wherein the valves are controlled by a control unit.

Preferably the required level of disbursal is determined based upon a mapped information concerning requirements at different locations in the field and wherein a position of the vehicle in the field is determined. Such positioning can be determined through the GPS In a further refinement of the present invention the amount of the applied material could be varied based upon the location in the field. This information could be provided automatically by taking advantage of data provided by the Global Positioning Satellite system (GPS).

In one embodiment of the invention the vehicle carries a reel for receiving a hose thereon through which the waste material is supplied to the vehicle wherein the reel is hollow and the storage tank is located inside the hollow reel such that the reel rotates around the outside of the storage tank.

A decrease in pressure is affected upon the discharge opening for release of the waste material. This eliminates unwanted dribbling or spillage when the opening is shut off. As a consequence of this pressure drop, there is no need to wait for the boom to drain prior to moving and blockage at the discharge openings is virtually eliminated.

Preferably, the vehicle portion carries a reel having a hose wrapped thereon, the reel being rotatable to reel in and pay out the hose for communication of the waste material from a supply location through the hose to the vehicle portion. The reel may be hollow, providing a location for the storage tank containing supplemental material.

Preferably, the boom has a greater width than 10 feet and the hose has a length greater than 700 feet. The boom height is adjustable for crops as high as 4 feet. The adjustable boom height allows for the application of waste material throughout the growing season without the risk of damage to the tops of the plants from the machine. Multiple applications of waste material to the crop throughout the growing season has several advantages, growth is promoted by providing nutrients throughout the growing season, multiple applications of waste material increases the amount of material that can be disposed of in a single growth season and, the height of the crops will inhibit the spread of odor from the waste material. The concept of the adjustable height boom for application of fertilizer during the growth season could also be applied to other row crops, such as corn.

Preferably, the waste material is transported by a pump from the container through the hose to the reel vehicle. Preferably, the vehicle portion includes a supplementary pump thereon for the waste material. This will allow for uniform pressure to be maintained, allowing the waste material to be spread at a rate in the range of 1000 to 6000 gallons per acre.

BRIEF DESCRIPTION OF THE DRAWINGS

Like element numbers reference corresponding parts in the different figures.

DETAILED DESCRIPTION

Figure 1:
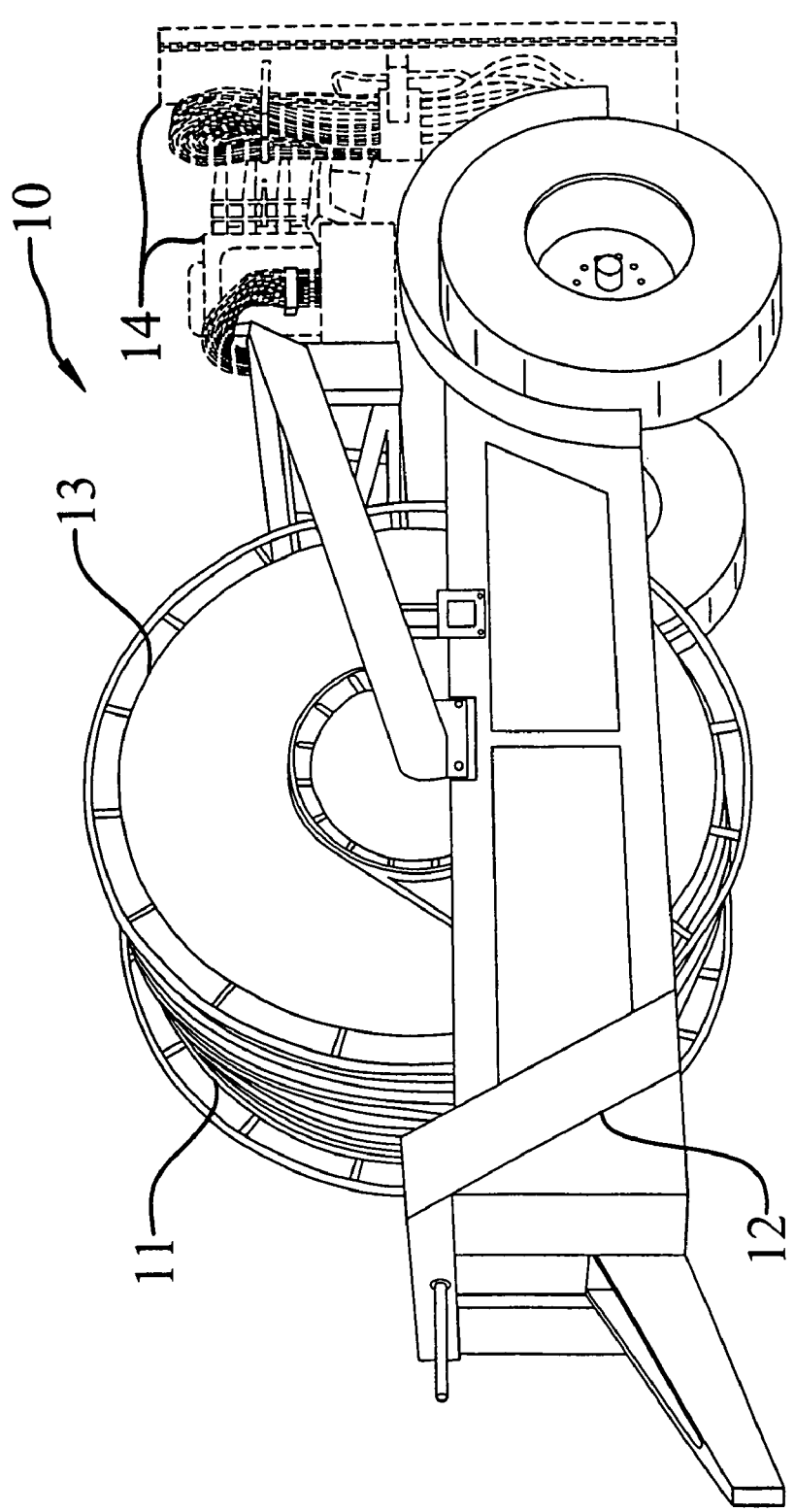
FIG. 1 is a perspective view of the prior art reel system.

FIG. 1 shows the prior art hose dispensing system wherein the axis of the reel is perpendicular to the direction of travel and there is no hose dispensing boom. Element 10 is the device as a whole. Element 13 is the reel and 11 is the hose. Element 14 is the dispensing system for insertion of the waste material into the ground (not part of the present invention) and element 12 is the frame of the hose dispensing system.

Figure 2:
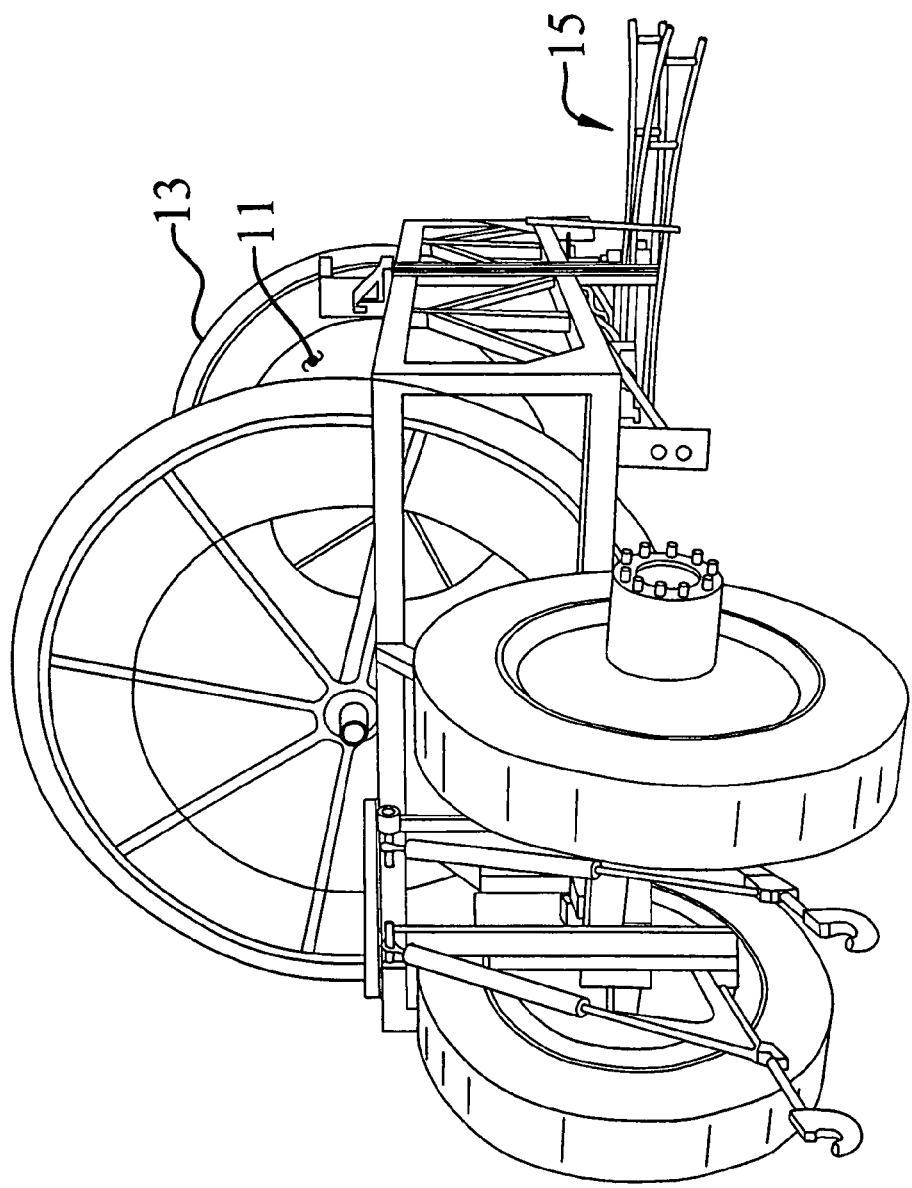
FIG. 2 is a side perspective view of the present invention including the side hose dispensing system boom.

FIG. 2 is a perspective view of the present invention wherein element 11 is the hose and element 13 is the reel. Element 15 is the boom for dispensing and retrieval of the hose.

Figure 3:
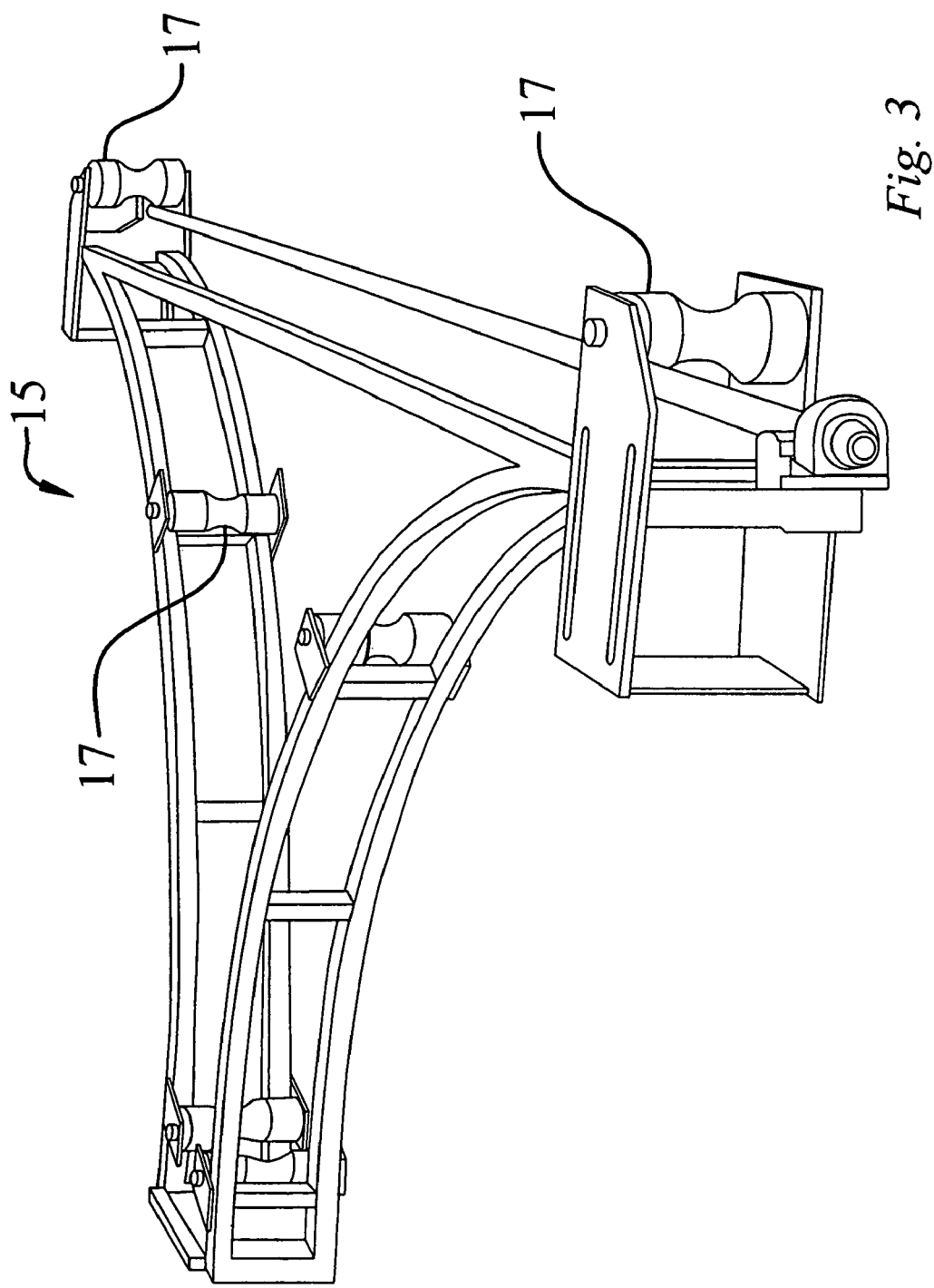
FIG. 3 is a perspective view of the hose dispensing system or boom.

FIG. 3 is a detailed perspective of the hose dispensing boom wherein element 17 is a hose dispensing roller. The dispensing boom is connected to the frame of the system. This boom can be raised or lowered to accommodate the height of the crop.

The present invention is designed for enhanced application rates for slurry fertilizer, and operation at speeds in the range of 5 to 8 miles per hour. The present invention employs a unique hose dispensing and retrieval and boom.

The invention includes novel features and a combination of elements described and illustrated fully herein. It will be understood that various modifications may be made without departing from the spirit of the invention or sacrificing any of its advantages.

Having thus disclosed in detail one embodiment of the invention, persons skilled in the art will be able to modify certain of the structure shown and to substitute equivalent elements for those disclosed while continuing to practice the principle of the invention, and it is, therefore, intended that all such modifications and substitutions be covered as they are embraced within the spirit and scope of the claims.

INDUSTRIAL APPLICABILITY

This invention provides solutions to the problems associated with the prior art hose reel systems. The unique reel orientation and dispensing/retrieval boom causes less crop damage and reduces soil compaction. The modern animal agriculture business is always in search of more productive means of waste disposal and this invention progresses the state of the art.

We claim:

1. A method of applying a waste material to a field comprising the steps of:

providing an apparatus for applying a waste material to a field, the apparatus including a frame having a wheel and a fluid applicator attached thereto, the wheel adapted to facilitate a movement of the frame in a direction of travel, a hose reel rotatably disposed on the frame and having an axis of rotation substantially parallel to the direction of travel, a hose having one end extending from the reel and in fluid communication with a remote source of the waste material and an opposite end in fluid communication with the fluid applicator, the hose adapted to be wound on and paid out from the reel, and a boom disposed on and extending from the frame adapted to dispense the hose on a surface of the field substantially parallel to the direction of travel;

pumping the waste material from the source through the hose and to the fluid applicator;

moving the apparatus across the field, paying out the hose from the reel parallel to the direction of travel when the apparatus is moving away from the source of the waste material and winding up the hose on the reel when the apparatus is moving toward the source of the waste material; and dispensing the waste material from the fluid applicator as the apparatus moves across the field.

2. An apparatus for applying a waste material to a field comprising:

a frame having a wheel and a fluid applicator attached thereto, the wheel adapted to facilitate a movement of the frame in a direction of travel;

a hose reel rotatably disposed on the frame and having an axis of rotation substantially parallel to the direction of travel;

a hose having one end extending from the reel and in fluid communication with a remote source of the waste material and an opposite end in fluid communication with the fluid applicator, the hose adapted to be wound on and paid out from the reel; and a boom disposed on and extending from the frame adapted to dispense the hose on a surface of the field substantially parallel to the direction of travel.

3. The apparatus according to claim 2, wherein the boom is movably mounted to the frame.

4. The apparatus according to claim 3, wherein the boom is movable to change a distance between the boom and a surface of the field.

5. The apparatus according to claim 2, wherein the boom is generally Y shaped.

6. The apparatus according to claim 2, further comprising a plurality of rollers disposed on the boom to facilitate a movement of the hose therethrough.

7. The apparatus according to claim 2, wherein the boom is disposed on and extends from a lateral side of the frame.

* * * * *